Dec. 31, 1963  J. E. THRAP  3,115,662
HYDRAULIC WINDSHIELD WIPER MOTOR AND SYSTEM
Filed June 20, 1961  2 Sheets-Sheet 1
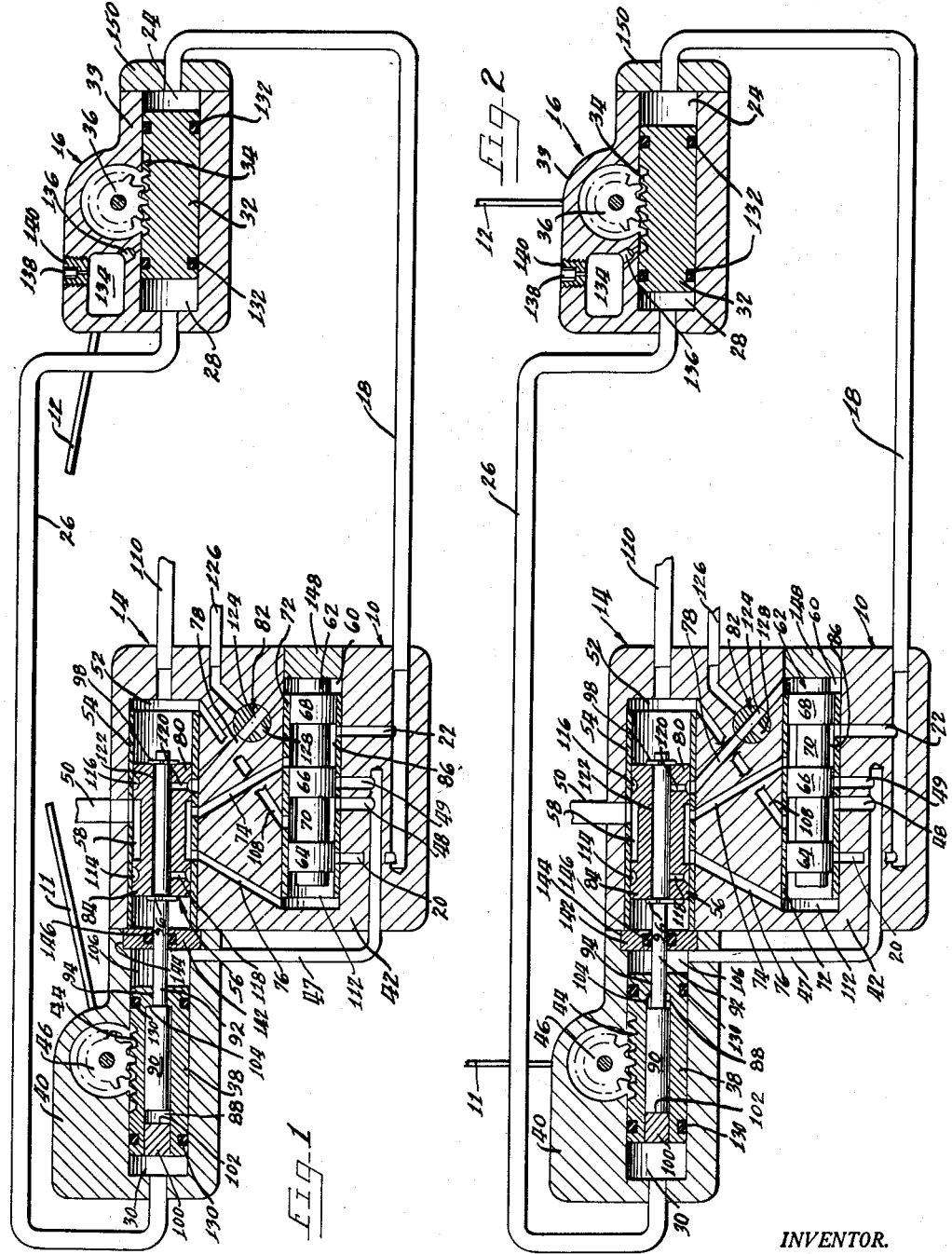
INVENTOR.
John E. Thrap
BY
ATTORNEYS Dec. 31, 1963
J. E. THRAP
3,115,662
HYDRAULIC WINDSHIELD WIPER MOTOR AND SYSTEM
Filed June 20, 1961
2 Sheets-Sheet 2
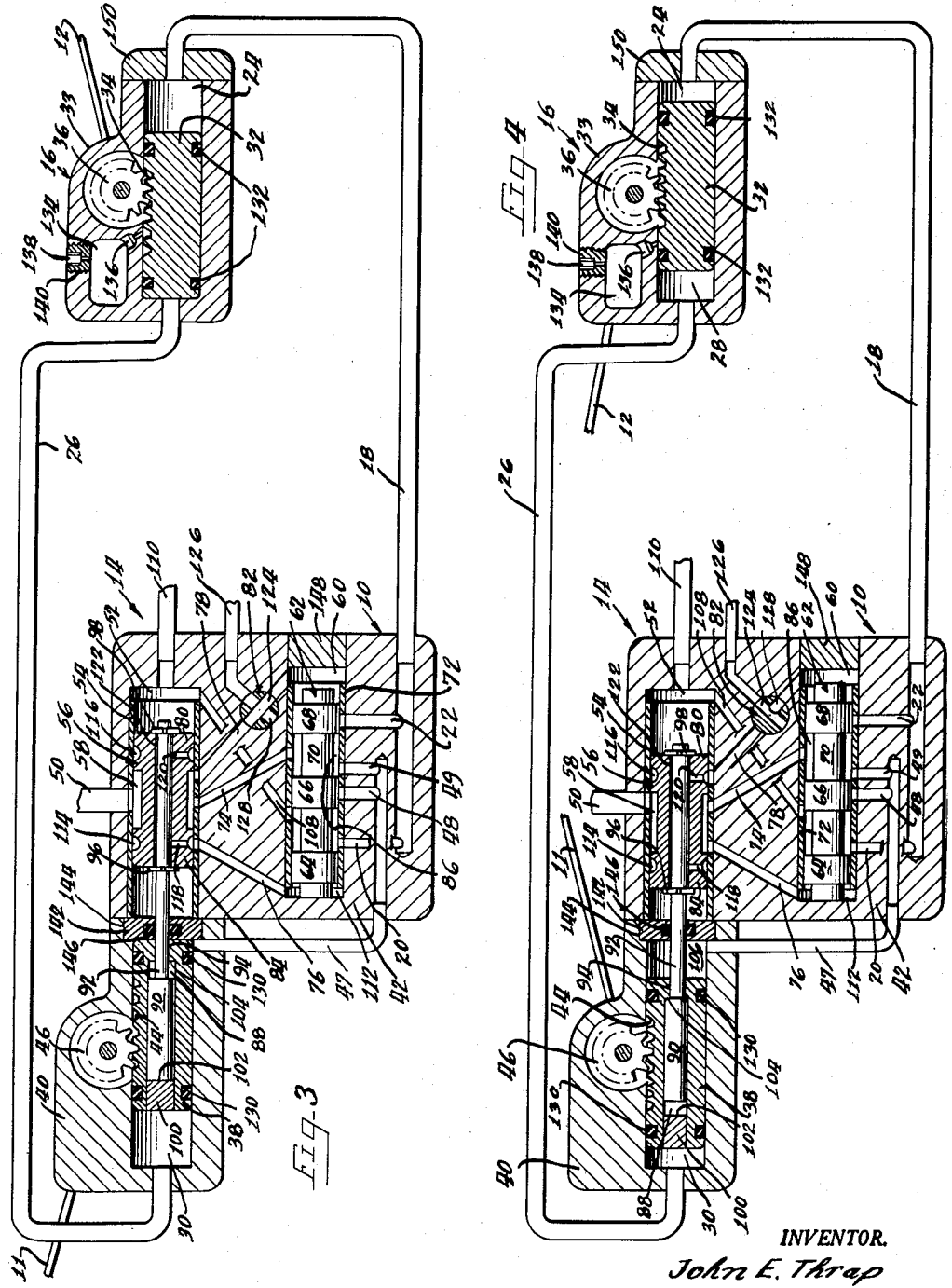
INVENTOR.
John E. Thrap
BY
ATTORNEYS United States Patent Office 3,115,662
Patented Dec. 31, 1963

3,115,662
HYDRAULIC WINDSHIELD WIPER MOTOR
AND SYSTEM
John E. Thrap, Columbus, Ohio, assignor to Thompson Ramo Wooldridge Inc., Cleveland, Ohio, a corporation of Ohio
Filed June 20, 1961, Ser. No. 118,298
10 Claims. (Cl. 15—250.16)

This invention relates to a motor and system for a windshield wiper or the like and more particularly to a windshield wiper system for automotive use or the like which has no rigid mechanical linkage between the right and left-hand wiper blades.

In a conventional windshield wiper system, a rigid mechanical linkage joins the right and left-hand wiper blades on the windshield. However, this construction requires close tolerances in manufacture and is subject to frequent mechanical failure and misalignment. The present invention overcomes these difficulties by providing a hydraulic linkage between a master motor unit operating one of the wipers and a "slave" mechanism operating the other of the wipers and which is controlled by the action of the master motor unit. Fluid is supplied to the system under pressure by means of a power steering pump, engine oil pump or any other suitable pumping mechanism, and the master motor unit includes a spool valve which in one position directs pressurized fluid to move a second valve so that the pressurized fluid may pass to the slave mechanism. The so-called slave mechanism has a piston which operates the wiper thereof by a rack and pinion action when fluid is thus introduced thereto and the piston in turn then pressurizes a second piston associated with the master motor unit to operate the wiper thereof through similar rack and pinion means. The second piston during the course of its movement contacts a linkage element slidably retained therein to move the spool valve in the master motor unit to a second position wherein pressurized fluid acts upon the second valve to cause the second valve to prevent passage of fluid to the slave mechanism and to transmit fluid pressure to the second piston to move it in the reverse direction so that the linkage therein returns the spool valve to the first mentioned position thereof. The reverse movement of the second piston, of course, turns the wiper thereon in a reverse direction of angular movement, and the first mentioned piston is pressurized through the hydraulic linkage by the said reverse movement of the second piston so that it also reciprocates to move its wiper in the reverse direction of angular rotation, whereby a cycle of movement for the wipers is completed. In will thus be appreciated that a continuous wiping action may be achieved without any rigid mechanical linkage such as has heretofore been required.

In order to place the wipers in a "park" position, one of the conduits leading from the spool valve to the second valve is provided with a turn valve which maintains the said conduit open during movement of the wipers but closes the conduit and communicates the source of pressure to the second valve in a manner which effects the reverse movement above described but which maintains the second valve in the position for effecting the reverse movement so that further movement is prevented. At the completion of this reverse movement, of course, the blades will generally be disposed so that they extend toward one another.

The pressurized fluid introduced into the master motor unit as described is pumped to the source of fluid by the piston which is linked to the spool valve. To accommodate expansion and contraction of fluid when the wipers are in the "park" position, however, a reservoir chamber is formed in the "slave" unit which is similar in function to the master cylinder of an automobile.

Accordingly, it is an object of the present invention to provide a hydraulic windshield wiper motor and system.

Another object of the invention is to provide a motor and system as described which eliminates the previously required mechanical linkage between the respective wiper blades.

Another object of the invention is to provide a device as described wherein the blades are synchronized hydraulically and actuated by pressurized fluid from a source such as a power steering pump, engine oil pump, or the like.

Another object of the invention is to provide a device as described which affords continuous reciprocation of the blades when a turn valve is moved to one position and which places the blades in a park position upon rotation of the turn valve to another position.

Another object of the invention is to provide a device as described having a master motor unit and a slave motor unit dependent upon the operation of valves in the master motor unit which in turn are controlled by the pressurized fluid and the movement of a piston associated with the master motor unit.

Yet another object of the invention is to provide a device as described which is simple and reliable and which may be used in a variety of situations where synchronized action of elements such as windshield wipers is required.

Other objects and advantages of the invention will become apparent as the description proceeds in accordance with the drawings in which:

FIGURE 1 is a schematic view of a hydraulic windshield wiper motor according to the present invention in a position such as to initiate outward sweep of the wiper blades;

FIGURE 2 is a view of the motor showing the wiper blades midway in the outward sweep and a wiper actuating piston for the master motor unit in initial contact with a link controlling a spool valve in the master motor unit;

FIGURE 3 is a corresponding view showing the wiper blades at the conclusion of their outward sweep and with the motor in a position such as to initiate their inward sweep; and FIGURE 4 is a view showing the motor and wiper blades in park position.

Referring now to the drawings, a windshield wiper motor 10 is shown according to the present invention, which operates hydraulically so that a pair of wiper blades 11 and 12 are synchronized without any mechanical linkage being required. The motor 10 includes a master motor unit 14 which is in series circuit with a "slave" motor unit 16 through a hydraulic circuit which includes a conduit 18 communicating conduits 20 and 22 in the master motor unit with a chamber 24 in the slave motor unit, and a conduit 26 communicating a chamber 28 in the slave unit with a chamber 30 forming a part of the master motor unit.

The blades 11 and 12 are preferably operated by rack and pinion means and thus a piston 32 is reciprocably mounted in a bore in a casing 33 forming the chambers 24 and 28 in the unit 16, and defines a rack 34 meshing with a pinion 36 for the blade 12. Likewise, a piston 38 is reciprocably mounted in a bore in a casing 40 which forms the chamber 30, the casing 40 preferably being secured in any suitable manner to a block 42 for the master motor unit 14 while the casing 33 for the sleeve motor unit 16 is entirely separate and spaced from the unit 14. The piston 38 also forms a rack 44 meshing with a pinion 46 for the blade 11.

The conduit 26 thus hydraulically links the pistons 32 and 38 for synchronized reciprocation, in cooperation with the conduit 26 and a conduit 47 leading from conduits 48 and 49 in the block 42 into the other end of the bore in casing 40. In order to achieve this result, hydraulic fluid is supplied to the master motor unit 14 by means of a power steering pump, engine oil pump or any other available pumping mechanism (not shown) through a conduit 50. The conduit 50 enters a chamber 52 in the block 42, which may be lined for a major portion of its length by a suitably apertured plastic liner 54 or the like.

To control the operation of the device, a spool valve 56 is reciprocably mounted within the chamber 52 and the liner 54 and defines a central annular recess forming a chamber 58 which is in continuous communication with the conduit 50.

The conduit 18 is thus intermittently communicated with the chamber 58 and the conduit 50 by means of a chamber 60 which receives a second valve 62 having three axially spaced lands 64, 66 and 68 mounted on a stem 70 which projects outwardly beyond the lands 64 and 68. The valve 62 reciprocates in a liner 72 for the chamber 60. In the position of FIGURE 1, the valve 62 affords communication between the conduit 22 and the chamber 58 via a conduit 74 which enters an intermediate portion of the chamber 60 so that it is continuously in communication therewith. Accordingly, the fluid from the conduit 50 is passed through the chamber 58, conduit 74, chamber 60 and conduit 22, into the conduit 18, thereby to move the piston 32 to the left as the result of pressure introduced into the chamber 24 from the conduit 18. Simultaneously, the chamber 28 is reduced to pressurize piston 38 and move it to the right, by passage of hydraulic fluid through the conduit 26 into the chamber 30. Accordingly, an outward sweep of the blades is achieved.

It will also be seen that in the position of FIGURE 1, pressurized fluid is introduced to the left-hand side of the valve 62 via a conduit 76 communicating at that time with the chamber 58. However, a conduit 78 is sealed from the pressurized chamber 58 by a land 80 on the spool valve 56. The conduit 78 is in continuous communication with the right-hand side of the chamber 60 and, as hereinafter noted, a turn valve 82 is rotatably mounted in the block 42 to form a portion of the conduit 78, in the operative condition of the motor 10.

Referring to FIGURE 3, reverse movement of the blades 11 and 12 is achieved by movement of the valve 56 to the right to cause a land 84 thereon to seal the conduit 76 from the pressurized chamber 58. In this position of the spool valve 56, the conduit 78 communicates with the chamber 58 to pressurize the right-hand side of the valve 62. Thus the valve 62 is moved to a left-hand position such that the chamber 60 communicates with the conduit 49 via the area 86 between the lands 66 and 68 which is in continuous communication with the conduit 74 and chamber 58. Thereby, the piston 38 is moved to the left and the chamber 30 is reduced to transmit hydraulic fluid through the conduit 26 to the chamber 28, simultaneously moving the piston 32 to the right. As indicated, this movement of the pistons 38 and 32 effects an inward sweep of the blades 11 and 12.

It is therefore apparent that the spool valve 56 controls the second valve 62 so as to pass fluid alternately through the right-hand lower conduit 18 or through the left-hand lower conduit 47.

In order to control the movement of the spool valve 56, the piston 38 is provided with an internal elongated chamber 88 in which is reciprocably received a linkage head 90 whose length is less than the length of the chamber 88 by a predetermined amount such as to afford a lost motion and time delay action. The linkage head 90 has a stem 92 extending outwardly through a right-hand opening 94 in the piston 38. The stem 92 is fixedly connected in coaxial relation to the piston 56, as by stop elements 96 and 98 at each end of the spool valve. The piston 38 has an insert or plug 100 therein which forms an end wall 102 for the chamber 88.

At the position of FIGURE 1, which represents the beginning of the outward sweep of the wiper blades 11 and 12, it will be seen that the linkage head 90 is spaced from the wall 102. As the outward sweep progresses, however, the end wall 102 contacts the head 90, as seen in FIGURE 2, and moves it and the spool valve 56 to the right, and to the position shown in FIGURE 3. Thus it will be appreciated that a full extent of movement of the pistons 38 and 32 to complete the outward sweep of the wiper blades 11 and 12 is provided, but the movement of the head 90, stem 92 and spool valve 56 is less than the movement of the piston 38 and is just sufficient to change the position of the spool valve so as to close the conduit 76 from chamber 58 and open the conduit 78 to the chamber 58.

Conversely, a lost motion and time delay action is afforded by the movement of the piston 38 to the left, from the position shown in FIGURE 3 as hereinabove described. Thus a wall or surface 104 is formed in the piston 38 opposite the wall 102 and which engages the head 90 of the linkage after a predetermined amount of movement to the left of the said piston 38, thereby to draw the spool valve 56 back into the position of FIGURE 1 from the position thereof shown in FIGURE 3.

Accordingly, the spool valve 56 will have a shorter stroke than the piston 38 and the piston 32 will have a stroke equal to that of the piston 38 and will reciprocate substantially in phase and simultaneously therewith for effecting synchronized cycling of the blades 11 and 12.

It will be appreciated that the time delay mechanism described is afforded so that pressure tending to reverse the direction of the pistons is not released until the full movement of the pistons in a given direction has been achieved. However, by proper calibration of the conduits 76 and 78 with the spool valve 56, an integral connection between the said spool valve and the piston 38 may be encompassed within the scope of the invention.

When the piston 38 is moved to the right as seen in FIGURE 2, fluid will be passed from the right-hand chamber 106 in the bore in casing 40, through the conduit 47 and upwardly through the conduit 48 to communicate with a conduit 108 which enters the right-hand end of the chamber 52 and with a conduit or return line 110 leading from the chamber 52 to return the fluid to a reservoir or the like for the pumping system. The right-hand position of the valve 62 which affords this fluid release is effected by pressure introduced from the conduit 50 and chamber 58 through the conduit 76 to the left-hand portion 112 of the chamber 60. At this time the conduit 49 and conduit 47 are sealed from pressurized fluid by the land 66. When the valve 62 is in the position of FIGURE 3 for introducing fluid through the conduits 47 and 49 to the chamber 106, the land 66 seals off the conduit 48 to prevent communication thereof with the return line 110.

Conversely, during the movement of the piston 32 to the right from the position thereof shown in FIGURE 3, fluid is passed from the chamber 24 through the conduit 18 and thence through the conduit 20 into the chamber 60 to communicate through the conduit 108 and chamber 52 with the return line 110. However, when the conduit 18 is pressurized via the conduits 50 and 22, as shown in FIGURE 6, the land 64 seals off the conduit 20 from the return line 110.

The spool valve 56 is designed to accommodate pressure in the chamber 60 effected by the reciprocation of the second valve 62. To this end, annular recesses 114 and 116 are formed in the lands 84 and 80 respectively and these recesses in turn communicate with radial passages 118 and 120 connected by a central axial bore 122 within the spool valve 56 which receives the stem 92. The recesses 114 and 116 are thus spaced axially so that in the position of FIGURE 1 the recess 116 communicates with the passage or conduit 78 while the recess 114 is sealed by the liner 54 and in the position of FIGURE 3 the recess 114 communicates with the conduit 76 and the recess 116 is sealed by the liner 54. Accordingly, when pressure is introduced at the left-hand side of the valve 62, as shown in FIGURE 1, the passage 78 will relieve the pressure at the right-hand side of the chamber 60 via passage 120; and when the right-hand side of the valve 62 is pressurized, as shown in FIGURE 3, the conduit 76 will relieve the left-hand side 112 of the chamber 60 via the recess 114 and the passage 118. The passages 118 and 120 will thus alternately receive the excess fluid and the bore 122 may in turn have some communication with the chamber 52 and with the return line 110.

In order to position the motor 10 in "park" condition, the valve 82 is turned so that a passage 124 therein is placed in register with a conduit 126 which communicates with the source of pressurized fluid. The valve 82 has an auxiliary passage 128 communicating with the passage 124 at an angle such as to register with the lower portion of the conduit 78 at such time. The passage 124 in the operative condition of the motor forms a portion of the conduit 78. When the turn valve has its passage 124 in register with the conduit 126 as described, therefore, the right-hand side of the chamber 60 is pressurized to overcome the tendency of the valve 62 to move to the right from the position of FIGURE 4.

When the pistons 38 and 32 have moved outwardly to the position of FIGURE 1 from the position of FIGURE 3 as the result of the pressure imparted through the conduit 47, the spool valve 56 will also have been returned to the position of FIGURE 1 as hereinabove set forth. This positioning of the spool valve 56 will open the conduit 76 to the source of pressure in conduit 50 and thus will pressurize the left-hand side of the chamber 60 indicated by numeral 112. The pressure introduced through the conduit 124 will, as stated, overcome the pressure at the area 112 to maintain the land 68 in sealing relationship to the passage 22 and prevent repressurizing of the conduit 18. Thus the piston 32 will not move to the left and the piston 38 will not return to the right so that a "park" condition for the motor will be maintained as seen in FIGURE 4.

Since the unit 16 is a "slave" mechanism depending on the action of the master motor unit 14, the chambers 28 and 100 and the conduit 26 form a completely sealed enclosure and the respective pistons 32 and 38 are provided with O rings 130 and 132 respectively. The fluid employed may undergo some expansion or contraction depending on temperature conditions and the like when the motor 10 is in the "park" condition and therefore a reservoir chamber 134 is formed in the casing 44 for the unit 16, which communicates through a passage 136 with the bore in which the piston 32 is received. A vent 138 may be formed for the chamber 134 as by a plug 140 threaded in the casing 33. This reservoir is thus similar in function to the master cylinder of an automobile.

The bore for the piston 38 is sealed from the chamber 52 for the spool valve 56 by means of a disk or the like 142 which may be secured in a recess 144 in the casing 40 so as to abut the block 42 of the unit 14, although various types of divider constructions may be utilized within the scope of the invention and in fact the casing 40 may be formed separately from the block 42. The disk 142 retains an inner O ring 146 sealing the stem 92 during its reciprocable movement. The chamber 60 may also be formed as a bore sealed by a plug or the like 148 to provide the desired length for the chamber in relation to the valve 62. Similarly, the bore for the piston 32 may be closed off by an end wall 150 on the casing 33 which is apertured to receive the conduit 18.

There has thus been provided a windshield wiper system having a minimum of moving parts and which is adapted to operate effectively over extended periods of time. The elimination of a mechanical link between the respective wiper blades affords a simplified construction which obviates the need for close tolerances, and also prevents undue stress in the event that one of the wiper blades inadvertently is restrained, with consequent elimination of misalignment such as has occurred with previously available wipers. It will also be evident that the system is applicable to a wide range of installations requiring synchronized movement of individual parts.

Although I have herein set forth and described my invention with respect to certain specific principles and details thereof, it will be understood by those skilled in the art that the invention is not limited thereto but is to be construed in accordance with the spirit and scope of the hereunto appended claims.

I claim as my invention:

1. A windshield wiper comprising a pair of housings each having a chamber, a piston reciprocably received in each of said chambers, each of said pistons forming a rack, a pinion journaled in each of said housings in meshing relation with the piston therein, a wiper blade on each of said pinions, a conduit connecting a corresponding end of each of said chambers, hydraulic fluid in said conduit, each of said chambers having a conduit entering the other end thereof, a housing having a pair of chambers therein, said last-named conduits each having a bifurcated end entering one of said pair of chambers, a source of pressurized fluid entering the other of said pair of chambers, a return line leading from said other of said pair of chambers, a spool valve in said other of said pair of chambers, means linking said spool valve with one of said pistons for reciprocation therewith, a pair of conduits leading from said other of said pair of chambers to opposite ends of said one of said pair of chambers, and positioned to be alternately closed by reciprocation of said spool valve, a valve in said one of said pair of chambers reciprocated by fluid from said source of pressurized fluid introduced into said one of said pair of chambers alternately through said pair of conduits, a conduit continuously communicating said one of said pair of chambers with said source of pressurized fluid and a conduit continuously communicating said one of said pair of chambers with said return line, said valve in said one of said chambers having a plurality of lands spaced axially to alternately communicate said bifurcated conduits with said source of pressurized fluid and with said return line through alternate branches of the bifurcations so that one of said bifurcated conduits communicates with said source of pressurized fluid when the other of said bifurcated conduits communicates with said return line.

2. A windshield wiper comprising a pair of housings each having a chamber, a piston reciprocably received in each of said chambers, each of said pistons forming a rack, a pinion journaled in each of said housings in meshing relation with the piston therein, a wiper blade on each of said pinions, a conduit connecting a corresponding end of each of said chambers, hydraulic fluid in said conduit, each of said chambers having a conduit entering the other end thereof, a housing having a pair of chambers therein, said last-named conduits each having a bifurcated end entering one of said pair of chambers, a source of pressurized fluid entering the other of said pair of chambers, a return line leading from said other of said pair of chambers, a spool valve in said other of said pair of chambers, means linking said spool valve with one of said pistons for reciprocation therewith, a pair of conduits leading from said other of said pair of chambers to opposite ends of said one of said pair of chambers, and positioned to be alternately closed by reciprocation of said spool valve, a valve in said one of said pair of chambers reciprocated by fluid from said source of pressurized fluid introduced into said one of said pair of chambers alternately through said pair of conduits, a conduit continuously communicating said one of said pair of chambers with said source of pressurized fluid, a conduit continuously communicating said one of said pair of chambers with said return line, said valve in said one of said chambers having a plurality of lands spaced axially to alternately communicate said bifurcated conduits with said source of pressurized fluid and with said return line through alternate branches of the bifurcations so that one of said bifurcated conduits communicates with said source of pressurized fluid when the other of said bifurcated conduits communicates with said return line, a turn valve in one of said pair of conduits and a second source of pressurized fluid leading to said turn valve, said turn valve opening said one of said pair of conduits between said pair of chambers while sealing said second source of pressurized fluid therefrom in one position thereof, and closing said one of said pair of conduits between said pair of chambers while opening said second source of pressurized fluid to said one of said pair of chambers in another position thereof.

3. A synchronized cycling device comprising a pair of housings each having a chamber, a piston reciprocably received in each of said chambers, a conduit connecting one end of each of said chambers, hydraulic fluid in said conduit, each of said chambers having a conduit entering the other end thereof, a housing having a pair of chambers therein, said last-named conduits each having a bifurcated end entering one of said pair of chambers, a source of pressurized fluid entering the other of said pair of chambers, a return line leading from said other of said pair of chambers, a spool valve in said other of said pair of chambers, means linking said spool valve with one of said pistons for reciprocation therewith, a pair of conduits leading from said other of said pair of chambers to opposite ends of said one of said pair of chambers, and positioned to be alternately closed by reciprocation of said spool valve, a valve in said one of said pair of chambers reciprocated by fluid from said source of pressurized fluid introduced into said one of said pair of chambers alternately through said pair of conduits, a conduit continuously communicating said one of said pair of chambers with said source of pressurized fluid and a conduit continuously communicating said one of said pair of chambers with said return line, said valve in said one of said chambers having a plurality of lands spaced axially to alternately communicate said bifurcated conduits with said source of pressurized fluid and with said return line through alternate branches of the bifurcations so that one of said bifurcated conduits communicates with said source of pressurized fluid when the other of said bifurcated conduits communicates with said return line.

4. A synchronized cycling device comprising a pair of housings each having a chamber, a piston reciprocably received in each of said chambers, a conduit connecting one end of each of said chambers, hydraulic fluid in said conduit, each of said chambers having a conduit entering the other end thereof, a housing having a pair of chambers therein, said last-named conduits each having a bifurcated end entering one of said pair of chambers, a spurce of pressurized fluid entering the other of said pair of chambers, a return line leading from said other of said pair of chambers, a spool valve in said other of said pair of chambers, means linking said spool valve with one of said pistons for reciprocation therewith, a pair of conduits leading from said other of said pair of chambers to opposite ends of said one of said pair of chambers, and positioned to be alternately closed by reciprocation of said spool valve, a valve in said one of said pair of chambers reciprocated by fluid from said source of pressurized fluid introduced into said one of said pair of chambers alternately through said pair of conduits, a conduit continuously communicating said one of said pair of chambers with said source of pressurized fluid, a conduit continuously communicating said one of said pair of chambers with said return line, said valve in said one of said chambers having a plurality of lands spaced axially to alternately communicate said bifurcated conduits with said source of pressurized fluid and with said return line through alternate branches of the bifurcations so that one of said bifurcated conduits communicates with said source of pressurized fluid when the other of said bifurcated conduits communicates with said return line and means for selectively pressurizing and depressurizing one end of said one of said pair of chambers to prevent further reciprocation of the valve therein and further reciprocation of said pistons and said spool valve and to initiate reciprocation of said valve therein said pistons and said spool valve as desired.

5. A device for actuating elements in synchronized cycles comprising a pair of housings each forming a chamber therein, a piston reciprocably disposed in each of said chambers in substantially sealing relationship thereto, a fluid filled conduit intercommunicating one end of each of said chambers, a housing having first and second chambers therein, a valve reciprocably disposed in each of said first and second chambers, means linking the valve in said first chamber with one of said pistons to reciprocate the valve by reciprocation of the piston, first conduit means connecting the other end of each of said chambers receiving said pistons with said second chamber, a source of pressurized fluid communicating with said first chamber, means relieving pressurized fluid from said first chamber and second conduit means connecting said first and second chambers, said valves having sealing surfaces and said second conduit means cooperating with said sealing surfaces to reciprocate said valve in said second chamber in response to reciprocation of said valve in said first chamber, said first conduit means cooperating with the surfaces on said valve in said second chamber to alternately communicate said source of fluid pressure with the other ends of said chambers receiving said pistons while successively alternately communicating said means relieving pressurized fluid with the other ends of said chambers receiving said pistons.

6. A device for actuating elements in synchronized cycles comprising a pair of housings each forming a chamber therein, a piston reciprocably disposed in each of said chambers in substantially sealing relationship thereto, a fluid filled conduit intercommunicating one end of each of said chambers, a housing having first and second chambers therein, a valve reciprocably disposed in each of said first and second chambers, means linking the valve in said first chamber with one of said pistons to reciprocate the valve by reciprocation of the piston, first conduit means connecting the other end of each of said chambers receiving said pistons with said second chamber, a source of pressurized fluid comunicating with said first chamber, means relieving pressurized fluid from said first chamber and second conduit means connecting said first and second chambers, said valves having sealing surfaces and said second conduit means cooperating with said sealing surfaces to reciprocate said valve in said second chamber in response to reciprocation of said valve in said first chamber, said first conduit means cooperating with the surfaces on said valves to alternately communicate said source of fluid pressure with said other end of one of said chambers receiving said pistons while simultaneously communicating said means relieving pressurized fluid with said other end of the other of said chambers receiving said pistons and communicate said means relieving pressurized fluid with said other end of one of said chambers receiving said pistons while simultaneously communicating said means relieving pressurized fluid with said other end of the other of said chambers receiving said pistons and valve means selectively introducing fluid pressure into and sealing fluid pressure from said second chamber to prevent reciprocation of said valve in said second chamber and thereby to prevent reciprocation of said pistons and said valve in said first chamber and to initiate reciprocation of said valves and pistons as desired.

7. A synchronized cycling device comprising a pair of housings, a first chamber in one of said housings, a second chamber in the other of said housings, a piston reciprocably received in each of said chambers, a fluid filled conduit intercommunicating one end of each of said chambers, a third housing having third and fourth chambers therein, a first valve in said third chamber, a second valve in said fourth chamber, first conduit means connecting said fourth chamber with the other ends of said first and second chambers, a source of pressurized fluid, second conduit means connecting said source of pressurized fluid with said third chamber, third conduit means connecting said source of pressurized fluid with said fourth chamber, fourth conduit means connecting said third chamber with opposite ends of said fourth chamber, fluid release means, fifth conduit means connecting said third and fourth chambers with said fluid release means and means reciprocating said first valve as a function of the reciprocation of one of said pistons, said first valve controlling said third conduit means to reciprocate said second valve and said second valve controlling said first conduit means to alternately communicate the other ends of said first and second chambers with said third conduit means and said source of pressurized fluid and with said fifth conduit means and said fluid release means, said other end of said first and second chambers communicating with one of said third and fifth conduit means when the other end of the other of said first and second chambers communicates with the other of said third and fifth conduit means.

8. A device for actuating elements such as windshield wipers and the like comprising a housing having first and second chambers therein, a first valve in said first chamber, a second valve in said second chamber, a pair of piston means, hydraulic means linking said piston means for mutual reciprocation, means reciprocating said first valve as a function of the reciprocation of one of said piston means, said first valve being a spool valve, a conduit leading from each end of said second chamber to said first chamber each located to be closed alternately from said source of pressurized fluid by said first valve to reciprocate said second valve, a conduit for each of said piston means, leading to said second chamber and each controlled by said second valve to alternately communicate said piston means with said source of pressurized fluid and to reciprocate said piston means in cooperation with said hydraulic means, and conduit means for releasing fluid from said chambers, said second valve alternately communicating said conduits for said piston means with said conduit means for releasing fluid from said chambers, a pair of passages in said first valve each communicating with one of said conduits leading from the ends of said second chamber when said one of said conduits is closed from said source of pressurized fluid and a passage in said first valve communicating said pair of passages with said conduit means for releasing fluid from said chambers whereby to alternately relieve pressure at the ends of said second chamber during reciprocation of said second valve.

9. A device for actuating elements such as windshield wipers and the like comprising a housing having first and second chambers, a first spool valve in said first chamber, a second valve in said second chamber, a pair of housings each having a chamber and a piston reciprocably received therein, one of said pistons being coaxial with said spool valve, a fluid filled conduit communicating between one end of each of said chambers for said pistons, a conduit communicating another end of each of said chambers for said pistons with said second chamber, a source of pressurized fluid leading to said first chamber and said second chamber, said one of said pistons having a pair of axially spaced stops, a link having a head engaged by alternate stops of said axially spaced stops during reciprocation of said one of said pistons and a stem connected to said spool valve and conduit means cooperating with said spool valve to alternately communicate said source of pressurized fluid with opposite ends of said second chamber, said second valve being configured to reciprocate in resonse to the alternate pressurization of said ends of said second chamber and to alternately communicate said conduits for the other ends of said chambers for said pistons with said source of pressurized fluid, said link affording a lost motion action such as to reciprocate said spool valve with a time delay from initial movement of said one of said pistons in one direction or the other whereby to pressurize said conduits for the other ends of said chambers for said pistons substantially upon completion of the stroke of the pistons in the direction toward said other ends of said chambers for said pistons.

10. A synchronized cycling device comprising a pair of housings each having a chamber, a piston reciprocably received in each of said chambers, each of said pistons forming a rack, a pinion journaled in each of said housings in meshing relation with the pinion therein, a conduit connecting one end of each of said chambers, hydraulic fluid in said conduit, each of said chambers having a conduit entering the other end thereof, a housing having a pair of chambers therein, said last-named conduits each having a bifurcated end entering one of said pair of chambers, a source of pressurized fluid entering the other of said pressurized chambers, a return line leading from said other of said pair of chambers, a spool valve in said other of said pair of chambers, means linking said spool valve with one of said pistons for reciprocation therewith, a pair of conduits leading from said other of said pair of chambers to opposite ends of said one of said pair of chambers, and positioned to be alternately closed by reciprocation of said spool valve, a valve in said one of said pair of chambers reciprocated by fluid from said source of pressurized fluid introduced into said one of said pair of chambers alternately through said pair of conduits, a conduit continuously communicating said one of said pair of chambers with said source of pressurized fluid, a conduit continuously communicating said one of said pair of chambers with said return line, said valve in said one of said chambers having a plurality of lands spaced axially to alternately communicate said bifurcated conduits with said source of pressurized fluid and with said return line through alternate branches of the bifurcations so that one of said bifurcated conduits communicates with said source of pressurized fluid when the other of said bifurcated conduits communicates with said return line, means for selectively pressurizing and depressurizing one end of said one of said pair of chambers to prevent further reciprocation of the valve therein and further reciprocation of said pistons and said spool valve and to initiate reciprocation of said valve therein, said pistons and said spool valve as desired and a reservoir in said housing for the other of said pistons having a reservoir chamber therein in communication with the chamber for said piston therein adjacent the rack on said piston to compensate for changes in fluid volume in said conduit connecting said chambers for said pistons.

References Cited in the file of this patent
UNITED STATES PATENTS

| | | |
|---|---|---|
| 2,516,558 | Freedman et al. | July 25, 1950 |
| 2,609,795 | Freedman et al. | Sept. 9, 1952 |
| 2,825,919 | Horton | Mar. 11, 1958 |
| 2,830,314 | Bitzer | Apr. 15, 1958 |